(12) United States Patent
Colentier et al.

(10) Patent No.: US 8,379,091 B2
(45) Date of Patent: Feb. 19, 2013

(54) INFRARED CAMERA AND METHOD FOR OBSERVING A SCENE

(75) Inventors: Sylvie Colentier, Paris (FR); Frédéric Duval, Paris (FR)

(73) Assignee: Sagem Defense Securite, Paris (FR)

( * ) Notice: Subject to any disclaimer, the term of this patent is extended or adjusted under 35 U.S.C. 154(b) by 603 days.

(21) Appl. No.: 12/601,539

(22) PCT Filed: May 30, 2008

(86) PCT No.: PCT/EP2008/056705
§ 371 (c)(1),
(2), (4) Date: Nov. 24, 2009

(87) PCT Pub. No.: WO2008/145735
PCT Pub. Date: Dec. 4, 2008

(65) Prior Publication Data
US 2010/0177195 A1    Jul. 15, 2010

(30) Foreign Application Priority Data

May 30, 2007 (FR) ..................... 07 55341

(51) Int. Cl.
*H04N 5/33* (2006.01)
(52) U.S. Cl. ..................... 348/164; 348/E5.09; 250/330; 250/332
(58) Field of Classification Search .................. 348/164, 348/E5.09; 250/330, 332, 336.1, 338.1, 339.02
See application file for complete search history.

(56) References Cited

U.S. PATENT DOCUMENTS

| | | | | |
|---|---|---|---|---|
| 4,122,344 A | * | 10/1978 | Lettington et al. | 348/164 |
| 5,710,722 A | * | 1/1998 | Wood | 348/E5.09 |
| 6,091,551 A | | 7/2000 | Watanabe | |
| 6,606,115 B1 | * | 8/2003 | Alicandro et al. | 348/164 |
| 2002/0179834 A1 | * | 12/2002 | Feygin | 250/332 |
| 2003/0006374 A1 | * | 1/2003 | McManus | 250/332 |
| 2003/0047683 A1 | * | 3/2003 | Kaushal | 250/330 |
| 2006/0232674 A1 | * | 10/2006 | Cochran | 348/164 |
| 2008/0048120 A1 | * | 2/2008 | Gooch | 250/338.4 |
| 2008/0203308 A1 | * | 8/2008 | Yoo | 250/352 |
| 2011/0169962 A1 | * | 7/2011 | Gat et al. | 348/164 |

FOREIGN PATENT DOCUMENTS

JP  2002-014283 A  1/2002
WO  WO 01/76261 A  10/2001

* cited by examiner

*Primary Examiner* — Bharat N Barot
(74) *Attorney, Agent, or Firm* — Blakely, Sokoloff, Taylor & Zafman (57) ABSTRACT

The invention relates to an infrared camera comprising an optical zoom, characterized in that it comprises: —a matrix detector (5) comprising a cooled screen, a matrix able to detect infrared radiation; —a module (123) for modifying the focal length of the camera, the modifying module being able to vary the focal length of the camera so as to ensure the optical zoom function of the camera; and —an imager module (L4) able to ensure, for all the values of focal length of the camera: on the one hand the focusing of the infrared radiation on the matrix of the detector, and on the other hand the conjugation of the pupil of the camera on the cooled screen of the detector. The invention also relates to a method of observing a scene with the camera according to the invention.

13 Claims, 6 Drawing Sheets

INFRARED CAMERA AND METHOD FOR OBSERVING A SCENE

The present patent application is a non-provisional application claiming the benefit of International Application No. PCT/EP2008/056705, filed May 30, 2008.

GENERAL TECHNICAL FIELD

The present invention relates to an infrared camera including an optical zoom.

It also relates to a method for observing a scene with such a camera.

STATE OF THE ART

Infrared cameras operating in the spectral bands of 3-5 µm or 8-12 µm generally integrate optics with two optical fields.

A large optical field is used for detecting the targets. In order to allow proper anticipation, the best compromise [viewing angle/resolution] is targeted (typically of the order of 10°).

The small optical field (typically of the order of 1°) is used for identifying the targets, or even for conducting the shooting in certain applications.

Certain cameras, in particular for aeronautical applications, integrate a third field between 20° and 40°, used for piloting.

The transition from one field to the other, which is performed by switching in the optical path of groups of lenses, is accompanied by a temporary loss of image for the operator.

For reasons of bulkiness and mechanical complexity, multifield objectives can hardly provide more than three optical fields.

Additional fields may be obtained by an electronic zoom but without any gain in resolution relatively to the current optical field.

Infrared cameras should further allow variable focusing in an area defined from infinity to a few tens of meters from the objective of the camera. This area is called the focusing area. If the object to be observed is outside the focusing area, thus being nearer to the objective, it is not possible to form a sharp image of the object on a detector of the camera. On the other hand, if the object to be observed is in the focusing area, the image of the object formed on the detector should be kept sharp during a change of field.

The whole of the optical functionalities and performances (fields, focusing distance, resolution for example) should further be guaranteed over a thermal operating range as extended as possible, in a transparent way for the user.

In order to be able to ensure continuous variation of the field while keeping the focusing, and for different operating temperatures, infrared cameras have an optical zoom conventionally including two motorizations which displace three mobile optical groups. Two mobile optical groups are displaced together via a mechanical cam in order to ensure continuous variation of the focal length for focusing to infinity and at an average temperature (typically 20° C.). A third independently motorized optical group allows modification of the focusing and compensation for the change in temperature.

Moreover a camera according to the preamble of claim 1 is known from JP 2002-014283.

On the other hand, JP 2002-014283 does not deal with keeping the focusing when the field varies.

Further, such a camera has a certain number of mobile optical groups, but their displacement law and the determination of their relative positions are complex. The displacement laws of the mobile optical groups are complex, which complexifies the driving of the groups.

PRESENTATION OF THE INVENTION

The invention proposes to overcome at least one of these drawbacks.

For this purpose, the objective of the camera is formed by a modifier module which forms an intermediate image at infinity from an object plane located in the focusing area in the scene (i.e. an object plane which is located at infinity or at a distance of the order of magnitude of about ten meters relatively to the objective).

When the object plane is located at infinity (or at a very long distance relatively to the objective) in the focusing area, the modifier module is a substantially afocal module with variable magnification.

It is understood that the focusing distance is operationally adjustable between infinity and about ten meters from the objective, which corresponds to the focusing area.

The image of a scene at the output of the modifier module is then conjugated on an array of an infrared detector by an imager module with fixed focal length.

Thus, the objective according to the invention always gives a sharp image, on the detector, of an object plane located in the focusing area and keeps a sharp image when the focal distance of the camera (i.e. its field) varies.

The assembly of the two modules is therefore an objective with a variable focal length, and with a variable focusing distance.

The modifier module is preferentially formed by three groups: a fixed conversion front group, a divergent mobile group and a convergent mobile group.

The fact that the modifier module is afocal according to the definition above gives the possibility, with only two mobile groups,
- of adjusting the focusing between infinity and a distance of a few tens of meters, and keeping this focusing while
- the focal length continuously varies in a high ratio (typically larger than 15) and
- the ambient temperature changes
- of improving the decoupling of the functions of each optical group making up the module; and
- of avoiding the presence of dead zones in the image over the whole range of focal distances of the camera.

Unlike the prior art, the displacements of the two motorized groups are computed by simple polynomial laws depending on three independent variables: focal length, focusing distance and temperature.

The function ensured by the mechanical cam in the prior art, difficult to produce mechanically, may then advantageously be replaced by digital processing which is very simple to achieve.

Thus, according to the invention, a camera is proposed according to claim 1.

The invention is advantageously completed by the features of claims 2 to 12.

The invention also relates to a method for observing a scene with such a camera.

The invention has many advantages.

Change in focal length, focusing (to infinity or to a finite distance smaller than the hyperfocal distance), as well as the independence of behavior towards temperature (athermalization), are ensured by the displacement of the divergent optical group (also called the variator) and of the convergent optical group (also called the compensator).

The respective functions of both aforementioned mobile groups are decoupled, notably by the fact that the modifier module is afocal according to the definition above. With the displacement of the divergent optical group (the variator) it is possible to vary the focal distance of the camera. With the displacement of the convergent optical group (the compensator) it is possible to keep to the focused image on a fixed focusing plane, i.e. an array of the detector, when the ambient temperature varies and when the focal length varies.

The displacements of the groups depending on the field, on the focusing distance and the operating temperature are governed by simple mathematical laws, compatible with real-time digital processing. This property allows driving by digital servocontrols from two independent motorizations, and the implantation of value-adding functionalities at the camera, such as an integrated telemetry function. Indeed:

The position of the variator is computable from a polynomial of at least order 1, depending on the reciprocal of the focal length. The coefficients of this polynomial are linearly dependent on temperature.

The relative position of the compensator relatively to the position of the variator is computable from a polynomial of at least order 1 depending on the focal length. The coefficients of this polynomial are linearly dependent on temperature and on the reciprocal of the focusing distance.

The polynomials very advantageously are at most of order 4.

Each mobile optical group, integrated in a displacement/guiding mechanism associated with a position-recopying device, is driven by digital servocontrol electronics. The servocontrol is achieved in velocity or in position on set values computed from the polynomial laws described above.

The positioning laws are very easily invertible and with them it is possible to provide in real time an accurate digital recopy of the focal position (accuracy with an error of less than 1%) and of the current focusing distance (accuracy with an error of less than 2%).

The objective of the camera is therefore an optical zoom with a continuously variable focal length, allowing coverage without any image loss (i.e. without any dead zone in the image, by the fact that the modifier module is afocal according to the definition above), the ranges of operational fields are for example comprised between 1° and 40° or even more, in an infrared band, for example the 3-5 µm band.

The operation of the zoom of the camera does not depend on temperature at least in the range substantially equal to [−40° C.; 70° C.]

The front group of the zoom consists of two convergent lenses. The outer lens is spherical, preferably in ZnS. This material is selected as an element in contact with the environment external to the camera for its durability towards the weather and mechanical environment. The internal lens is asphero-diffractive, preferentially in ZnSe. The ZnS/ZnSe combination ensures very low sensitivity to thermal gradients which may exist between both lenses (preserving the optical quality).

The camera has a large ratio of focal distances (typically larger than ×10, or even larger than ×20).

The spatial bulkiness of the camera may be changed depending on mechanical space allocated for each application.

In the developed application, the focal length ratio of ×20, over the temperature range of [−40+C, +70° C.] is obtained with mechanical travel of the variator of 55 mm and travel of the compensator of less than 40 mm.

The optical path may be bent as a U, by means of two mirrors, in order to at least implant both mobile groups in the length of the first optical arm. The length of the longer arm of the optics is about equal to half the maximum focal length of the zoom.

One of the mirrors may be motorized or mounted on piezo-electric blocks in order to dynamically displace the optical axis (axis stabilization, over-sampling, etc.).

The dynamic displacement of the optical axis may also be ensured by a tilted planar plate with parallel faces, rotationally mobile around the optical axis. The plate may be interposed between the last group of lenses of the imager module and the entry window of a cryostat in which the detector is placed. The tilt and the thickness of the plate are selected in order to generate a shift of the optical axis equivalent to a pixel of the detector. This is a microscanning device with which the resolution of the image may be increased.

The camera has constant numerical aperture over the whole range of focal length. The numerical aperture is equal to F/4 in the developed application.

The aperture diaphragm is located in the image space (materialized by the cooled screen of the detector).

The aperture diaphragm is conjugated on the front group for the longest focal length F of the camera. The conjugation then minimizes the diameter, the mass and the cost for making the front group.

The conjugation of the diaphragm on the front group leads to a ratio of the focal length of the optical group consisting of lenses 41 and 42 over the focal length of the group 43, having a value greater than 4.

PRESENTATION OF THE FIGURES

Other features, objects and advantages of the invention will become apparent from the following description which is purely illustrative and non-limiting and which should be read with reference to the appended drawings wherein.

DETAILED DESCRIPTION

Theoretical Reminders

Figure 1:
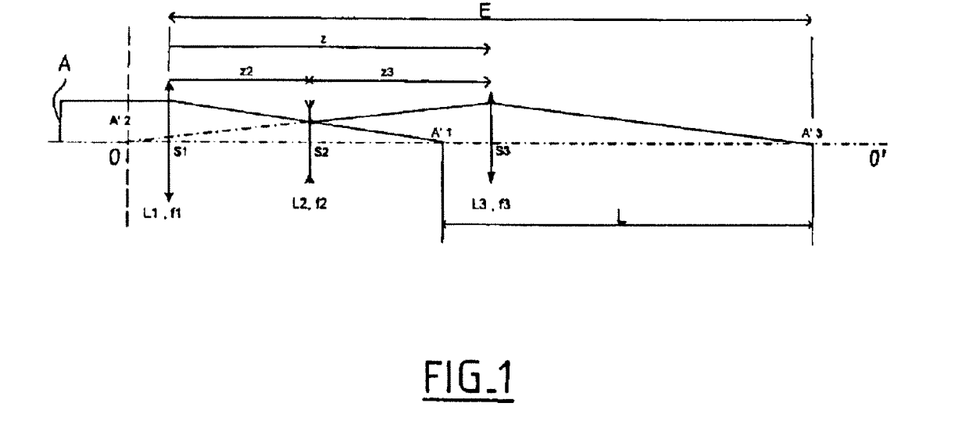
FIG. 1 is a functional optical diagram of an objective with variable focal length, to be used as an illustration for theoretical reminders useful for understanding the invention.

As shown schematically in FIG. 1, an objective with a variable focal length, intended to form an image in a fixed focal plane, of remote objects—for example located between a few tens of meters and infinity—consists of at least three groups of lenses, noted L1, L2 and L30, respectively, at least two of which (L2 and L30) are translationally mobile along the optical axis OO'. The groups L1 and L30 are convergent, while the group L2 is divergent.

The object A, the image focal plane A'3 of the camera and the image focal plane A'1 of the front group L1 are fixed.

Now, the displacement of the group L2 displaces the image plane A'2, conjugate to A'1. The group L30 should therefore also be displaced in order to maintain the conjugation between the plane A'2 and the fixed image plane A'3. The position of L30 is therefore subject to that of L2.

A magnification $m_2(z_2)$, variable depending on the position $z_2$ of L2 on the axis OO', is associated with the optical conjugation A'1/A'2.

A magnification $m_3(z_3)$, variable depending on the position $z_3$ of L30 on the axis OO', is associated with the optical conjugation A'2/A'3.

The focal length of the objective varies with the positions $z_2$ and $z_3$ of the groups L2 and L30 according to the following expression:

$$F(t_2)=f_1 \cdot m_2(z_2) \cdot m_3(z_3) \tag{Equ 1}$$

In this expression, $f_1$ is the focal length of the front group L1, which is fixed on the axis OO'.

However, optical conjugation is achievable if the Bessel conditions are met by L30, i.e. that the distance A'2A'3 should be larger than four times the focal length of the group L30.

The distance A'2A'3 depends on the position of the group L2.

$$A'_2 A'_3(m_2) = E - f_1 - f_2 \cdot \left(2 - \frac{1}{m_2} - m_2\right) \tag{Equ 2}$$

A'$_2$A'$_3$ ($m_2$) is minimum for $m_2=-1$, which gives $$A'_2 A'_3(-1) = E - f_1 - 4 f_2$$

The absence of a dead zone in the range of focal lengths to be covered is conditioned by the relationship:

$$E \geq f_1 + 4 \cdot (f_3 + f_2) \tag{Equ 3}$$

When the condition of Equ 3 is met, for each position of the group L2 (in other words for each value of $m_2$), there exists two possible positions of L30 with which the planes A'2 and A'3 may be conjugated with a magnification of $m_3$ and $1/m_3$ respectively.

Figure 2:
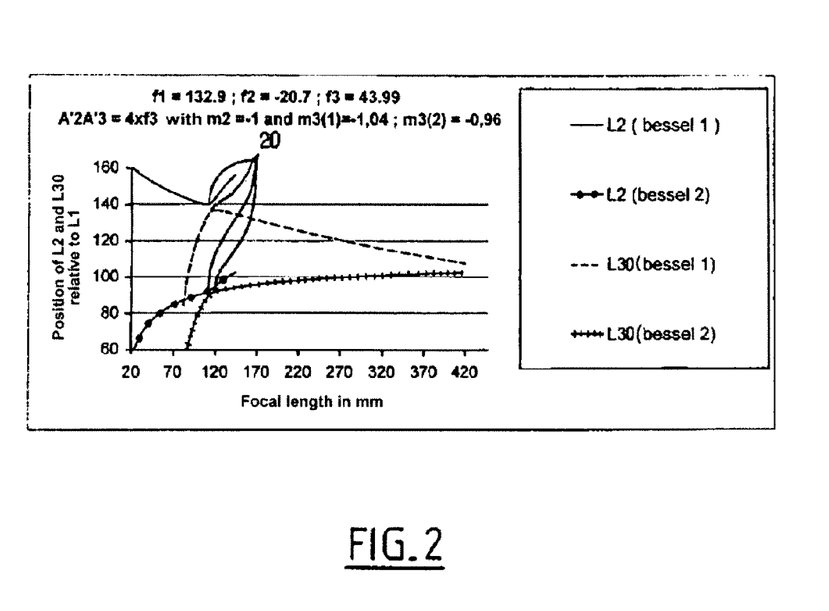
FIG. 2 is a graph showing the positions of L2 and L30 relatively to L1, visible in FIG. 1, versus the focal distance of the objective of FIG. 1.

As illustrated by FIG. 2 on a numerical example, an extended range of focal lengths is accessible, subject to discontinuities 20 in the travels of the mobile groups, which complexifies the driving of the groups, or even makes it unfeasible. As stated, when Equ 3 is verified, to each position $m_2$ of L2 correspond two positions of L30 which conjugate A'2 and A'3 with magnifications larger than 1 (position noted as Bessel 1) and less than 1 (Bessel 2), respectively. This Bessel 1 and Bessel 2 designation is transposed to the pair of positions L2/L30 on the graph of FIG. 2 illustrating the position of both groups versus the thereby reached focal length of the full zoom.

The focal length of the camera, either minimum or maximum, accessible without any discontinuity is about equal to the focal length of the group L1 (the discontinuity corresponds to $m_2=-1$ and $m_3\approx 1$).

In order to guarantee the feasibility of the optical computation, the minimum focal length of the group L1 is supposed to be about equal to the maximum exit pupil of the camera (indeed, correction of aberrations becomes difficult for a local aperture above F/1 on the group L1).

The maximum ratio of focal lengths accessible without any discontinuity is therefore equal to the aperture number of the camera.

In the example proposed in FIG. 2, the targeted maximum focal length is 420 mm, with an aperture of F/4. It is seen on the curves of FIG. 2 that the minimum focal length accessible without any discontinuity is actually of about 110 mm.

Figure 3A:
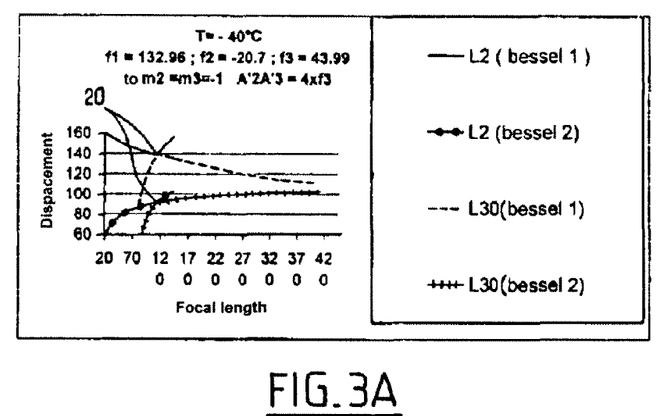
FIGS. 3A-3C are graphs compliant with the graph of FIG. 2, for a temperature of −40° C., +20° C. and +70° C., respectively.
Figure 3B:
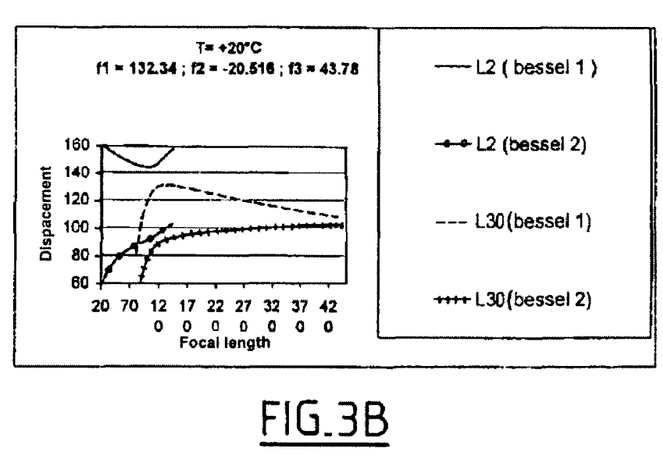
Figure 3C:
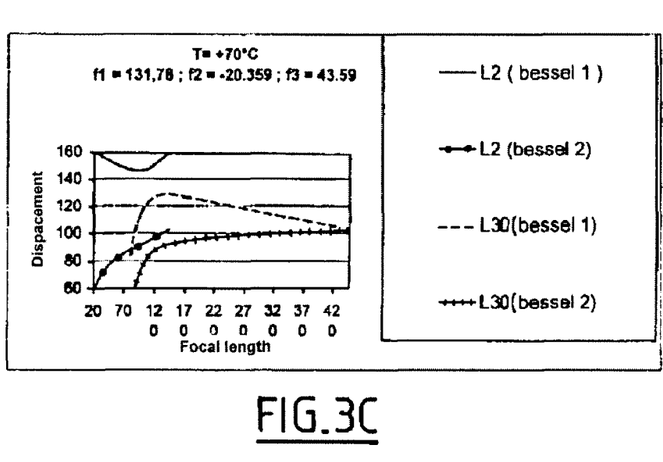

The discontinuities of the travels are eliminated in the particular case when the groups L2 and L30 pass through a magnification of −1 and 1 at the same time. However this configuration, which corresponds to a particular distribution of focal lengths, can only be achieved for a single temperature value. Now, as shown by FIGS. 3A-3C, over a range of operating temperatures of the infrared camera (typically −40° C. to +70° C.), the discontinuities 20 should be significant at one of the temperature limits—for example −40° C., see FIG. 3A—in order to avoid dead zones at the other limits—for example +70° C., see FIG. 3C—, taking into account the change in the focal lengths of the groups versus temperature.

Principle of the Invention

Figure 4:
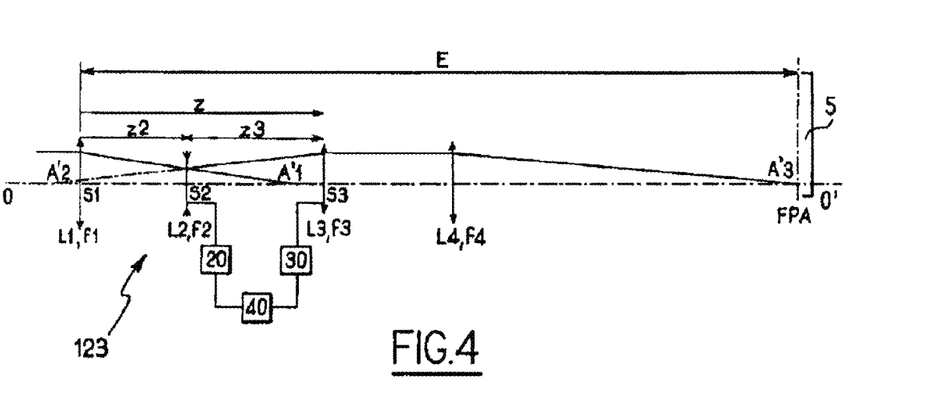
FIG. 4 is a functional optical diagram of a camera according to the invention.

FIG. 4 schematically illustrates the functional optical architecture of a camera for observing a scene, according to the invention, in which the group L30 of FIG. 1 is split into two components, i.e. a compensator group L3 and an imager module L4.

The camera has a focusing area.

The architecture of the camera thus includes the mobile groups L2 and L3 on the optical axis OO'.

L2 is a divergent group (i.e. with negative focal length) called a variator, and L3 is a convergent group (i.e. with a positive focal length) called a compensator.

The assembly of the groups L2 and L3 thereby form a module 123 for modifying the optical field, the modifier module being capable of varying the value of the optical field in order to ensure the optical zoom function of the camera.

The modifier module 123 preferentially includes a fixed front group L1. The modifier module 123 preferentially, but in a non-limiting way, forms an afocal group with variable magnification.

Very advantageously, the modifier module 123 is afocal.

In the present description by afocal is meant that the module 123 does not have any focal distance (the module 123 then gives an image at infinity of an object placed at infinity), or then has an extremely long focal distance. Thus the module 123 has a minimum focal distance of 30,000 mm (30 m) for the longest focal length of the camera.

The focusing area is comprised between infinity and a distance of the order of about ten meters relatively from the objective.

According to the invention, the modifier module 123 from an object plane located in the focussing area in the scene forms an intermediate image at infinity, so that the module is afocal according to the previous definition, i.e. it does not have any focal distance, or has a very long focal distance (larger than a distance of the order of 30 m).

First of all with afocality, it is possible to avoid the presence of dead zones in the image over the whole range of focal distances of the camera.

Further with afocality, it is possible to maintain focusing during a variation of the field of the camera. Indeed, as the modifier module 123 forms an intermediate image at infinity, the imager module which remains fixed, forms an image of the intermediate image in its focal plane for all the field values.

Next, with the afocality of the modifier module, it is possible to decouple the function of each optical group making up the module.

By displacing the divergent optical group (the variator) the focal distance of the camera may be varied. The displacement of the convergent optical group (the compensator) allows the focused image to be maintained on a fixed focusing plane, i.e. an array of the detector, when the ambient temperature varies or when the focal length varies.

The displacements of the groups depending on the field, the focusing distance and the operating temperature, are, as this is explained a little later, governed by simple mathematical laws, compatible with real-time digital processing.

This property allows driving by digital servocontrols from two independent motorizations and implantation of value-adding functionalities at the camera, such as an integrated telemetry function.

The group L3 is mobile on the optical axis OO' and focuses the image A'3 at a paraxial distance close to or equal to infinity. The above relationship (Equ 3) is therefore always verified, regardless of the temperature and of the focusing distance in the space of the scene to be observed. There is no dead zone in the accessible range of focal lengths.

The imager module L4, fixed on the axis OO', notably allows the image to be focused in the desired focal plane, i.e. the array of an array detector 5 capable of detecting infrared radiation. It also ensures transport of the pupil, so as to conjugate it on the cooled screen 50 of the detector. This pupil is positioned on the front group for the largest focal length.

The imager module L4 may itself consist of several optical sub-assemblies, so as to ensure image and pupil transport. It may also include, as this will be seen later on, bending mirrors, in order to optimize the bulkiness of the camera relative to the available mechanical volume.

The focal length of the camera is given by the relationship:

$$F(z_2) = m_2(z_2) \cdot \frac{f_1 \cdot f_4}{f_3}$$

In order to obtain a ratio R between the long focal length and the short focal length of the zoom of the camera, the divergent group L2 should cover the range of magnifications $$\left[ \frac{1}{-\sqrt{R}}; -\sqrt{R} \right]$$

At each position of L2 there exists a position of L3 which recovers the focusing at infinity. The full range of focal lengths is covered by continuous travels of both mobile groups L2 and L3.

In the proposed architecture, the displacement laws of both groups L2 and L3 on the optical axis OO' fit generic polynomial models.

The input variables are:
F: the focal distance of the camera;
T: the temperature of the medium in which the camera is placed;
D: the focusing distance in the space of the scene.

The displacement laws giving the positions z2 and z3 of the groups L2 and L3 are therefore:

$$z_2(F, T, D) = \sum_{i=0}^{n} C_{2,i}(T) \cdot \left(\frac{1}{F}\right)^i \quad \text{(Equ 4)}$$

$$z_3(F, T, D) = z_2(F, T, D) + \sum_{j=0}^{m} \left( C_{3,j}(T) + \frac{k_{3,j}}{D} \right) \cdot F^j$$

In these relationships, the coefficients $C_{2,i}(T)$ and $C_{3,j}(T)$ are linearly dependent on temperature (preferably taken in proximity to the front group L1). The coefficients $k_{3,j}$ are constants, independent of temperature.

The values of the coefficients $C_{2,i}(T)$, $C_{3,j}(T)$ and $k_{3,j}$ depend on manufacturing dispersions, and have to be determined by calibration on each camera. The number of calibration positions and the interpolation orders n and m are defined according to the sought accuracy.

In other words, the position of the variator is computed from a polynomial of at least order 1, as a function of the reciprocal of the focal length, the coefficients of this polynomial being linearly dependent on temperature.

As the relative position of the compensator relatively to the position of the variator is computed from a polynomial of at least order 1 as a function of the focal length, the coefficients of this polynomial are linearly dependent on temperature and on the reciprocal of the focusing distance.

The polynomials are very advantageously at most of order 4.

The finite distance focusing is ensured by displacement of the L3 group exclusively.

The proposed optical architecture leads to displacement laws of the mobile groups compatible with a control by digital servocontrols.

Each mobile optical group L2 or L3 is integrated in a displacement/guiding mechanism respectively including one motor 20 or one motor 30, associated with an electronic module 40 for recopying position. Each group is controllable by the electronic module 40, also capable of ensuring digital servo control in velocity or in position. The module 40 is connected to the motor 20 for driving the group L2 and connected to the motor 30 for driving the group L3. The module 40 is capable of controlling the motors 20 and 30 and also includes computation means.

Servocontrol is achieved in velocity or in position, on set values computed from the laws of the relationships (Equ 4).

The servocontrol in position consists of rejoining in minimum time discrete focal and/or focusing distance positions.

Servocontrol in velocity consists of passing in a continuous way and without image loss, from a focal position to another by following an ergonomic law of the change in the focal length over time. The sharpness of the images is retained on the initial focusing plane.

Of course, conversely, from positions of the mobile groups L2 and L3 (position recopying information), it is possible to compute the current values of the focal length and of the focusing distance. The proposed optical architecture leads to polynomial laws compatible with real-time digital processing.

This information may be transmitted by the camera to an external processing device via a serial link.

The field FOV, associated with a given point of the image is computable from the current positions z2 and z3 of the groups L2 and L3. Indeed, for an infinite focusing distance, the value of the field only depends on the position of the group L2. Further, in order to focus at a finite distance, only the group L3 is moved. But in this case, when the focusing distance is not infinity, the field value at infinity has to be corrected by a linear law depending on the position of the group L3, relatively to its position at infinity.

$$FOV(T, z_2, z_3) = (1 + a \cdot (z_3 - z_3(\infty))) \sum_{i=0}^{n} D_{2,i}(T) \cdot z_2^i$$

The coefficient a results from a theoretical calculation.

The coefficients $D_{2,i}(T)$ are determined with the same calibration data as the ones used for the coefficients $C_{2,i}(T)$.

The focusing distance D is computable from the current position z3 of L3, relatively to the position for focusing to infinity.

F is the focal length corresponding to the position z2 of the group L2 for a focusing distance at infinity.

$$D = \frac{\sum_{j=0}^{m} k_{3,j} F^j}{z_3 - z_3(\infty)} \quad \text{(Equ 5)}$$

With the law of (Equ 5) it is possible to compute, by means of the module 40 also forming computation means, the distance of a target in the scene from the measured current position of the group L3.

Focusing on the target may be carried out by manual adjustment or via autofocus by image processing.

The distance of the camera to the scene on which the focusing is carried out, is advantageously delivered by a serial link or by an inlaid display on the video, without resorting to a telemeter external to the camera.

Moreover, with the independent motors 20 and 30 of the mobile groups L2 and L3, it is possible to present to the detector 5 a defocused image of the scene. The uniform defocused image which corresponds to an average temperature of the observed scene, may periodically be presented in order to uniformize the responses of the pixels of the detector 5 with each other. This functionality saves additional motorization for an obturator.

The aperture diaphragm is conjugated on the front group for the longest focal length F of the camera. Conjugation then minimizes the diameter, the mass and the manufacturing cost of the front group.

Figure 5:
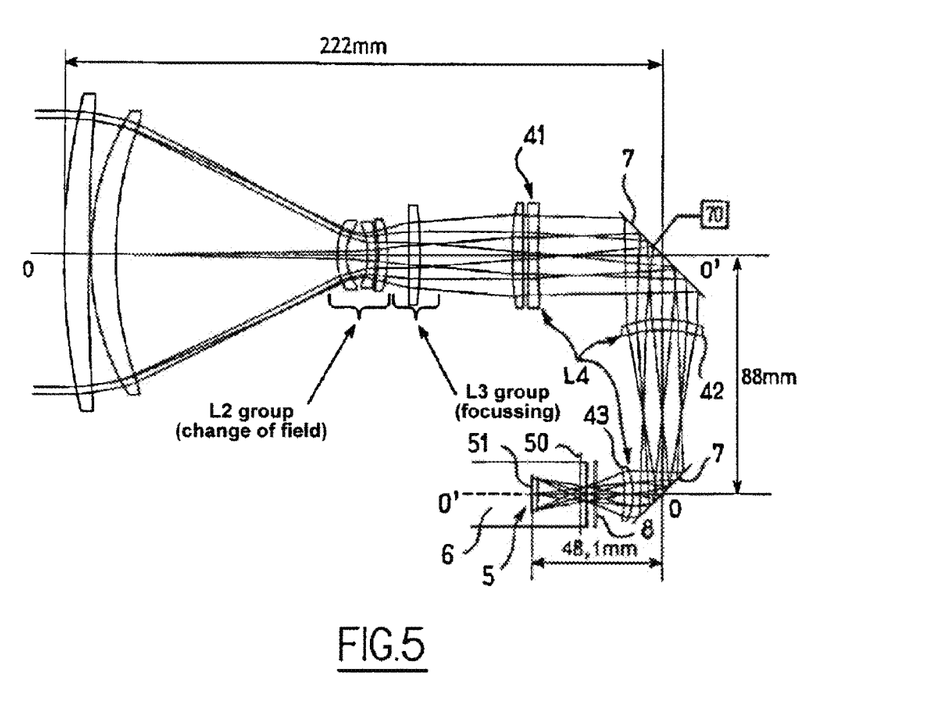
FIG. 5 is a functional optical diagram, in real lenses with a long focal length, of a camera according to the invention.
Figure 6A:
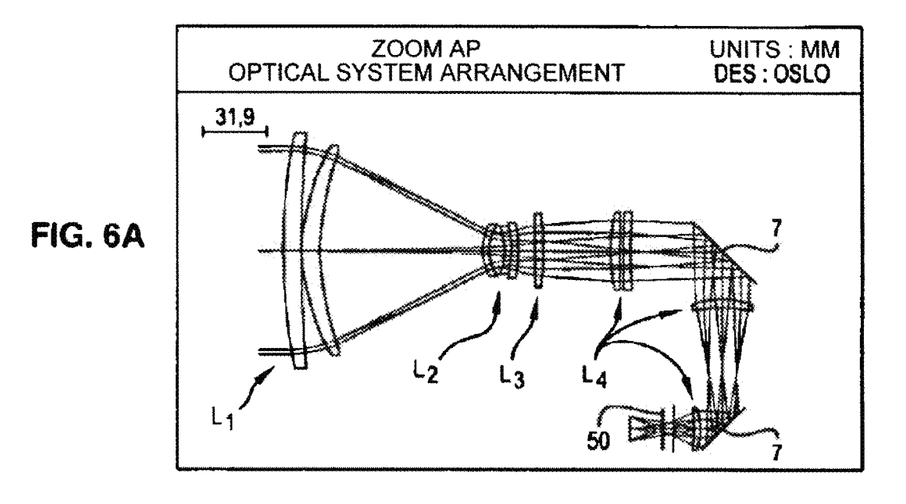
FIGS. 6A-6E are diagrams compliant with that of FIG. 5 for different positions of the optical groups.
Figure 6B:
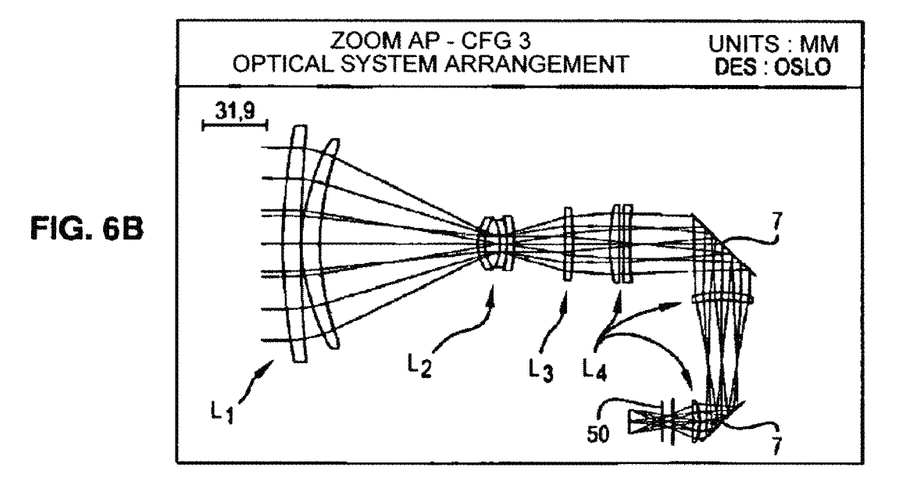
Figure 6C:
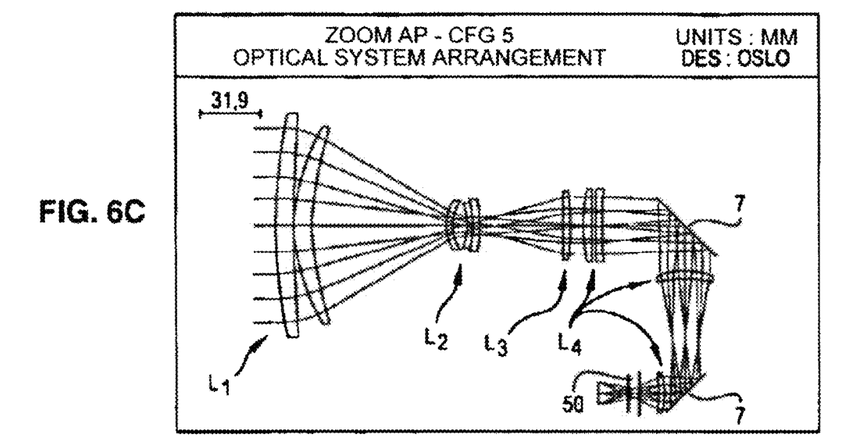
Figure 6D:
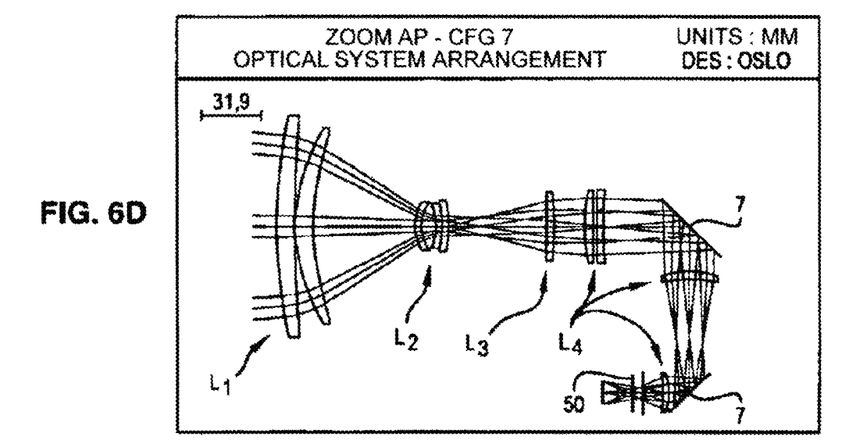
Figure 6E:
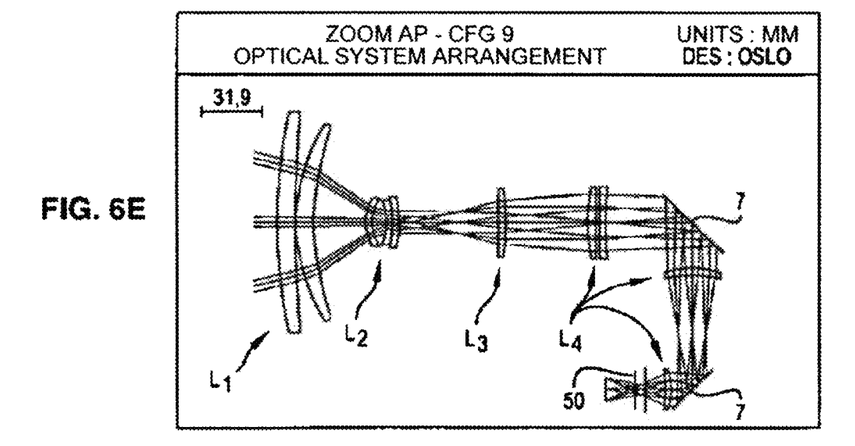

Conjugation of the diaphragm on the front group leads to a ratio of the focal length of the optical group consisting of lenses 41 and 42 over the focal length of the group 43, having a value greater than 4.

Example of a Zoom with a Ratio ×20 for a 3-5 Micrometer Array Camera

FIG. 5 shows an example in real lenses in a long focal length, of an architecture according to the invention applied to the development of a camera with continuously variable focal length between 21 mm and 420 mm (i.e. a ratio ×20) with an aperture of F/4.

The camera is associated with a cooled array detector 5 which is sensitive in the 3.7-4.8 μm spectral band. The detector includes a cooled screen 50. The screen 50 of the detector may be cooled with a cryostat 6.

The camera should operate with full performances in the range of temperatures [−40° C., +70° C.]

In this particular application, the distribution of the focal lengths of the different groups is the following at a temperature of 20° C.:

$f_1$=113.4 mm
$f_2$=−11.89 mm
$f_3$=76.02 mm
$f_4$=70.38 mm

The optical formula comprises ten lenses, including three aspherical surfaces and one asphero-diffractive surface.

The imager module L4 consists of three groups of lenses 41, 42 and 43 and of two bending mirrors 7.

The bulkiness was adapted to the volume allocated by U-shaped bending, achieved with two mirrors 7, positioned at 45° relatively to the optical axis OO'. One of the mirrors may, by displacement means 70, be motorized or mounted on piezo-electric blocks in order to dynamically displace the optical axis OO', in order to allow axis stabilization, oversampling, etc.

The camera also preferentially includes a tilted planar plate 8 with parallel faces and rotationally mobile around the optical axis OO' upstream from the detector 5, in order to generate a shift of the optical axis. The tilt and the thickness of the plate 8 are selected in order to generate a shift of the optical axis equivalent to a ½ pixel of the detector. This is a microscanning device with which the resolution of the image may be increased.

In order to allow proper operating independence of the camera with regard to temperature, the front group L1 of the zoom consists of two convergent lenses, the outer lens being spherical, preferentially in ZnS, the internal lens being asphero-diffractive, preferentially in ZnSe.

FIGS. 6A-6E illustrate the paths of the infrared radiation in a camera for different values of focal lengths. It is seen that the pupil of the camera is always conjugated on the cooled screen 50 of the detector.

In all the positions of focal lengths, the optical quality after tolerancing (i.e. including manufacturing both optical and mechanical dispersions) is compatible with the MTF (Modulation Transfer Function) performances resumed in Table 1.

TABLE 1

| Frequencies (line pairs/mm) | FTM on the OO' axis | FTM on the edge of the horizontal field |
| --- | --- | --- |
| 7.5 | 0.76 | 0.73 |
| 15 | 0.55 | 0.51 |
| 22.5 | 0.37 | 0.33 |
| 30 | 0.22 | 0.19 |

The displacement laws of the mobile groups are established by individual calibration of each camera in nine positions of focal lengths for three different temperatures, and then by polynomial interpolation of order 4, depending on the focal length or on the reciprocal of the focal length, between the calibration positions.

The calibration method consists of determining the position of the two mobile groups L2 and L3 (electrical information for position recopying) associated with an accurate optical measurement of the focal length (or of the field) and a readout from the temperature sensor. The position of the group L3 is optimized in order to obtain maximum FTM.

The global accuracy of the displacement laws (including the measurement and interpolation errors) over the whole focal range and in the whole range of temperatures is ±5 μm for the group L2
±30 μm for the group L3

Figure 7:
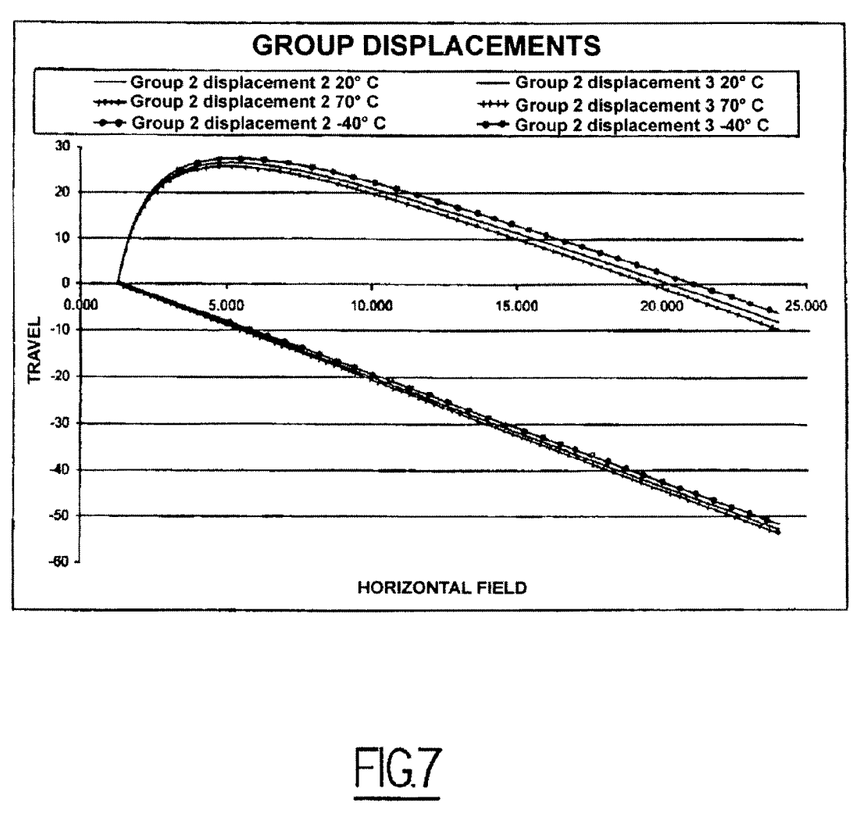
FIG. 7 is a graph showing the travel of both optical groups versus the field.

These errors are relative to the theoretical displacements computed for guaranteeing the optimum of the performances (see FIG. 7).

The positioning laws are invertible and may provide in real time an accurate digital recopying of the focal position (accuracy with an error of less than 1%) and of the current focusing distance (accuracy with an error of less than 2%).

It is recalled that exemplary positions of the groups L2 and L3 are given by FIGS. 6A-6E and by the graph of FIG. 7.

The invention claimed is:

1. An infrared camera for observing a scene, including an optical zoom having a focusing area in the scene and including:
   an array detector (5) including a cooled screen (50), an array (51) capable of detecting infrared radiation;
   a module (123) for modifying the focal distance of the camera, the modifier module being capable of varying the focal distance of the camera in order to ensure the optical zoom function of the camera; and
   an imager module (L4) capable of ensuring, for all the focal distance values of the camera:
   focusing of the infrared radiation on the array (51) of the detector (5), on the one hand, and conjugation of the pupil of the camera on the cooled screen (50) of the detector, on the other hand, said camera characterized in that the modifier module (123) forms an intermediate image at infinity, from an object plane located in the focusing area in the scene.

2. The camera according to claim 1, wherein the modifier module (123) includes:
   a variator optical group (L2) including at least one lens, the variator group being optically divergent and mobile on an optical axis (OO') of the camera; and
   a compensator optical group (L3) including at least one lens, the compensator group being optically convergent and mobile on the optical axis (OO') of the camera.

3. The camera according to claim 2, wherein the modifier module (123) further includes a convergent front group (L1) fixed on the optical axis (OO').

4. The camera according to claim 2, including a motor (20) for driving the variator optical group (L2) and a motor (30) for driving the compensator optical group (L3), each motor being connected to an electronic drive module (40), each driving of the optical groups (L2, L3) being carried out by digital servocontrol.

5. The camera according to claim 1, wherein the imager module (L4) consists of three groups of lenses (41,42,43) and of two bending mirrors (7).

6. The camera according to claim 5, wherein one of the mirrors is mobile in order to dynamically displace the optical axis (OO').

7. The camera according to claim 1, including a tilted planar plate (8) with parallel faces, rotationally mobile around the optical axis (OO'), upstream from the detector (5), in order to generate a shift of the optical axis.

8. The camera according to claim 3, wherein the front optical group of the zoom consists of two convergent lenses, the outer lens being spherical, preferentially in ZnS, the internal lens being asphero-diffractive, preferentially in ZnSe.

9. The camera according to claim 4, including a module (40) including computation means, capable of computing the variation of the focal distance of the camera and maintaining the focusing of the infrared radiation on the array (51) of the detector (5) and transporting the pupil of the camera on the cooled screen of the detector, controlling the independent displacement of both optical groups, the position of the variator being computed from a polynomial at least of order 1, depending on the reciprocal of the focal length, the coefficients of this polynomial being linearly dependent on temperature;
   the relative position of the compensator relatively to the position of the variator being computed from a polynomial of at least order 1 depending on the focal length, the coefficients of this polynomial are linearly dependent on the temperature and on the reciprocal of the focusing distance.

10. The camera according to claim 9, wherein the module (40) is capable of computing the distance from the camera to the scene from recopying position associated with the motor (30) of the compensator optical group.

11. The camera according to claim 1, having a constant numerical aperture over the whole range of variation of the focal distance of the camera, preferentially equal to the focal length divided by four, i.e. F/4.

12. The camera according to claim 1, the zoom of which has a ratio larger than ×10, preferentially larger than ×20.

13. The camera according to claim 2, including a module (40) of the camera is capable of ensuring that the variation of the focal distance of the camera, and the maintaining of the focusing of the infrared radiation on the array (51) of the detector (5) and of the transporting of the pupil of the camera on the cooled screen of the detector, are ensured by the independent displacement of both optical groups,
   the position of the variator being computed from a polynomial of at least order 1, depending on the reciprocal of the focal length, the coefficients of this polynomial being linearly dependent on temperature;
   the relative position of the compensator relatively to the position of the variator being computed from a polynomial of at least order 1 depending on the focal length, the coefficients of the polynomial are linearly dependent on temperature and on the reciprocal of the focusing distance.

* * * * *